United States Patent [19]

Leonhartsberger

[11] Patent Number: 4,961,372
[45] Date of Patent: Oct. 9, 1990

[54] CLOSING MECHANISM FOR AN INJECTION MOLDING MACHINE

[75] Inventor: Heinrich Leonhartsberger, Schwertbert, Austria

[73] Assignee: Engel Maschinenbau Gesellschaft m.b.H., Schwertberg, Austria

[21] Appl. No.: 348,306

[22] Filed: May 5, 1989

[30] Foreign Application Priority Data

May 19, 1988 [AT] Austria ................. 1305/88

[51] Int. Cl.⁵ .......................................... F01B 31/00
[52] U.S. Cl. .................................. 92/108; 92/81; 92/110; 92/112; 92/162 R; 92/165 R; 92/168
[58] Field of Search ................. 92/81, 107, 108, 110, 92/162 R, 162 P, 165, 166, 168, 112

[56] References Cited

U.S. PATENT DOCUMENTS

| 2,647,809 | 8/1953 | Schindler | 92/162 R |
| 2,661,721 | 12/1953 | Sherwen | 92/162 R |
| 3,136,223 | 6/1964 | Evans et al. | 92/162 R |
| 3,191,506 | 6/1965 | Ledeen | 92/162 |
| 3,335,642 | 8/1967 | Rosaen | 92/165 R |
| 4,791,854 | 12/1988 | Banicevic | 92/108 |

FOREIGN PATENT DOCUMENTS

| 122792 | 11/1944 | Australia | 92/165 R |
| 884880 | 6/1953 | Fed. Rep. of Germany | 92/162 R |
| 2442731 | 3/1976 | Fed. Rep. of Germany | 92/168 |
| 2811332 | 12/1978 | Fed. Rep. of Germany | 92/108 |
| 2311949 | 5/1976 | France | 92/108 |
| 397432 | 7/1960 | Switzerland | 92/165 R |

Primary Examiner—Edward K. Look
Assistant Examiner—Thomas Denion
Attorney, Agent, or Firm—Notaro & Michalos

[57] ABSTRACT

A closing mechanism of an injection molding machine has a piston-cylinder unit to be pressurized hydraulically. Two partial strokes can be carried out in the unit, of which the first can be run through faster than the second. A displacement tube (7) extends into a main cylinder chamber (6) and into an inner cylinder chamber (4) of a piston (2) of the piston-cylinder unit. The displacement tube (7) is fastened to an end wall of the main cylinder (1) and is open at its free end. The piston (2) is designed as a plunger and is spaces on all sides from the cylinder wall (5) of the cylinder (1) of the piston-cylinder unit. The piston (2) is guided in a flanged gland (15) which is screwed to the cylinder (1).

3 Claims, 1 Drawing Sheet

U.S. Patent
Oct. 9, 1990
4,961,372
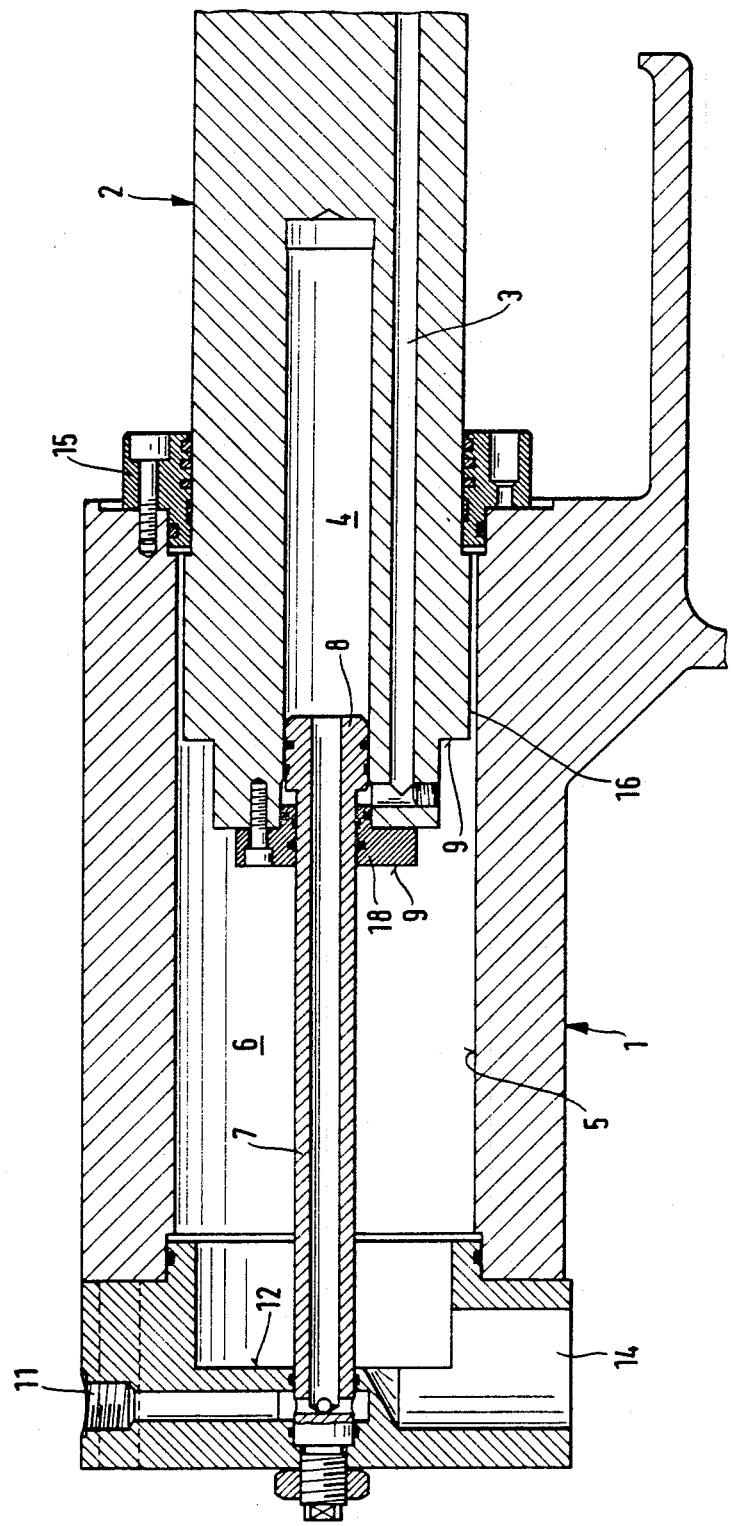

CLOSING MECHANISM FOR AN INJECTION MOLDING MACHINE

FIELD AND BACKGROUND OF THE INVENTION

The present invention relates to a closing mechanism of an injection molding machine, with a piston-cylinder unit to be pressurized hydraulically, by means of which two partial strokes can be carried out, of which the first can be run through faster than the second, with a displacement tube protruding axially into the cylinder chamber and into an inner cylinder chamber of the piston of the piston-cylinder unit, which tube is fastened to an end wall of the cylinder and is open at it's free end.

Such a closing mechanism is known for example from Austrian reference AT-PS No. 384,578 to the same applicant. With such a closing mechanism, as has been mentioned, a first partial stroke is run through quickly, followed by a second partial stroke in which a larger area of the piston is pressurized, owing to which a greater force can be produced. A practical possibility for the execution of such partial strokes is offered by the displacement tube which protrudes into the cylinder as well as into an inner cylinder of the piston.

SUMMARY OF THE INVENTION

It is the object of the invention to improve such a closing mechanism to the effect that it is much easier to manufacture. Also, the total friction in the closing system is to be reduced substantially.

This problem is solved in that the piston is designed as a plunger and is spaced on all sides from the cylinder wall of the cylinder of the piston-cylinder unit.

Due to the fact that the piston is spaced on all sides from the cylinder wall, the cylinder surface need not be machined but can remain in the untreated state. This means a substantial simplification in the construction of the closing device. A further advantage of the design according to the invention is that bubbles in the finished material of the cylinder will not lead to rejects.

Another feature of the invention provides the piston with a hydraulic conduit which opens into the inner cylinder chamber of the piston, the hydraulic conduit leading into the cylinder chamber at the end of the piston which is pressurized by the hydraulic fluid.

The oil feed through this conduit makes it possible for the return of the piston to be accomplished in a structurally simple manner.

The proper guiding of the piston can be improved by the formation, at the free end of the displacement tube, of a guiding cylinder on which the piston is guided by the cylinder wall of the inner cylinder chamber.

The present invention is thus directed to a closing mechanism for an injection molding machine having a piston-cylinder unit to be pressurized hydraulically and by means of which two partial strokes are carried out, a first partial stroke being run through faster than a second partial stroke, the mechanism comprising:

a main cylinder having a cylinder wall defining a main cylinder chamber, and an end wall;

a piston slidable into the main cylinder chamber and having an inner cylinder chamber, the piston forming a plunger which is spaced on all sides inwardly of the cylinder wall;

a displacement tube fastened to the end wall of the main cylinder and extending axially into the main cylinder chamber and into the inner cylinder chamber, the displacement tube being open at a free end thereof spaced from the end wall and disposed in the inner cylinder chamber; and sealing means fastened to the main cylinder at a location spaced from the end wall thereof, and slidably receiving the piston to form a seal for the main cylinder chamber.

BRIEF DESCRIPTION OF THE DRAWINGS

An embodiment of the invention is described below with reference to the annex drawing which is a sectional view of the mechanism of the invention.

DESCRIPTION OF THE PREFERRED EMBODIMENT

The parts of the injection molding machine not directly belonging to the invention are constructed according to the known state of the art and are therefore not shown in the drawing.

The closing mechanism of the invention includes a main cylinder 1 which is fixed in relation to the machine frame (not shown), of a piston-cylinder unit. A piston 2 is connected to the movable mold half of the unit (not shown), and slides in cylinder 1.

The piston 2 is provided with an inner cylinder chamber 4. From the end wall 12 of cylinder 1, a displacement tube 7 protrudes into the cylinder chamber 6 of cylinder 1, and into the inner cylinder chamber 4 of piston 2.

The cylinder chamber 6 has a connection 14 for connection of cylinder 1 to an oil line. Via a connection 11, hydraulic fluid is supplied to the displacement tube 7 and thus to the inner cylinder chamber 4 of piston 2.

Piston 2 is guided in a gland 15, which is screwed to cylinder 1 via a flange on gland 15. Piston 2 is designed as a plunger and is spaced on all sides inwardly of the cylinder wall 5 of main cylinder 1.

The flanged gland 15 forms, at the same time, a stop for the extracted piston 2 engaged by a cylinder ring 16 thereon, against the gland 15.

Piston 2 is sealed to the displacement tube 7 by a cover plate 18. In the drawing, piston 2 is show in the extracted position. Before the closing stroke begins, piston 2 is in its other end position, i.e. piston 2 is fully received into the cylinder chamber 6 and plate 18 is at or near the end wall 12.

For the execution of the first partial stroke—which is that partial stroke in which little force but increased speed is demanded—the piston-hydraulic fluid is pumped into the inner cylinder chamber 4 via the connection 11 and the displacement tube 7. Hence piston 2 is moved to the right. At that time a valve (not shown) which regulates the inflow of hydraulic fluid via the connection 14 into the cylinder chamber 6 remains open so that with the piston movement, hydraulic fluid is drawn into the cylinder chamber 6 at the same time.

When the first partial stroke is completed, i.e. the mold is closed, hydraulic fluid is pumped with a pump (not shown) via the connection 14 into the cylinder chamber 6, and piston 2 is pressurized on its entire wall 9.

Naturally, instead of one connection 14, two connections may be provided, hydraulic fluid being pumped into the cylinder chamber 6 through one connection during the first partial stroke.

To return the piston 2 to the open position, hydraulic fluid is pumped into the inner cylinder chamber 4 via conduit 3. At the same time the valves (not shown) in the fed lines for connections 11 and 14 are opened, so that the hydraulic fluid can escape via connection 11 as well as via connection 14.

At the free end of the displacement tube 7 a guiding cylinder 8 is formed, on which the piston 2 is guided by the cylinder wall of the inner cylinder chamber 4.

What is claimed is:

1. A closing mechanism for an injection molding machine having a piston-cylinder unit to be pressurized hydraulically and by means of which two partial strokes are carried out, a first partial stroke being run through faster than a second partial stroke, comprising:
    a main cylinder having a cylinder wall defining a main cylinder chamber, and an end wall;
    a piston slidable into the main cylinder chamber and having an inner cylinder chamber, the piston forming a plunger which is spaced on all sides inwardly of the cylinder wall, the piston having a piston ring disposed in the main cylinder;
    a displacement tube fastened to the end wall of the main cylinder and extending axially into the main cylinder chamber and into the inner cylinder chamber, the displacement tube being open at a free end thereof spaced from the end wall and disposed in the inner cylinder chamber, a guiding cylinder connected to the free end of the displacement tube and slidably engaged in the piston and against a cylinder wall of the inner cylinder chamber;
    a cover plate fixed to the piston and slidably receiving the displacement tube, the guide cylinder forming a large diameter end of the displacement tube and being retained in the inner cylinder chamber by the cover plate;
    sealing means fastened to the main cylinder at a location spaced from the end wall thereof, and slidably receiving the piston to form a seal for the main cylinder chamber; and
    the piston including a hydraulic conduit extending parallel to the inner cylinder chamber, the hydraulic conduit having an inner end communicating with the inner cylinder chamber at a location near the cover plate.

2. A closing mechanism according to claim 1 wherein the sealing means comprises a flanged gland fixed to an end of the main cylinder surrounding an end of the main cylinder chamber which is spaced from the end wall of the main cylinder, the piston ring being a cylinder ring connected around the piston and disposed in the main cylinder chamber for engagement with the flanged gland to stop the cylinder at an extreme extended position spaced from the end wall of the main cylinder.

3. A closing mechanism according to claim 1 wherein the main cylinder includes at least one connection for hydraulic fluid communicating with the main cylinder chamber and adjacent the end wall.

* * * * *